July 14, 1970 S. ABRAHAMSON ETAL 3,520,071
ANESTHESIOLOGICAL TRAINING SIMULATOR
Filed Jan. 29, 1968 11 Sheets-Sheet 1

INVENTORS
Stephen Abrahamson
Judson S. Denson
Alfred Paul Clark
Leonard Taback
Tullio Ronzoni BY Sheridan Neimark ATTORNEY

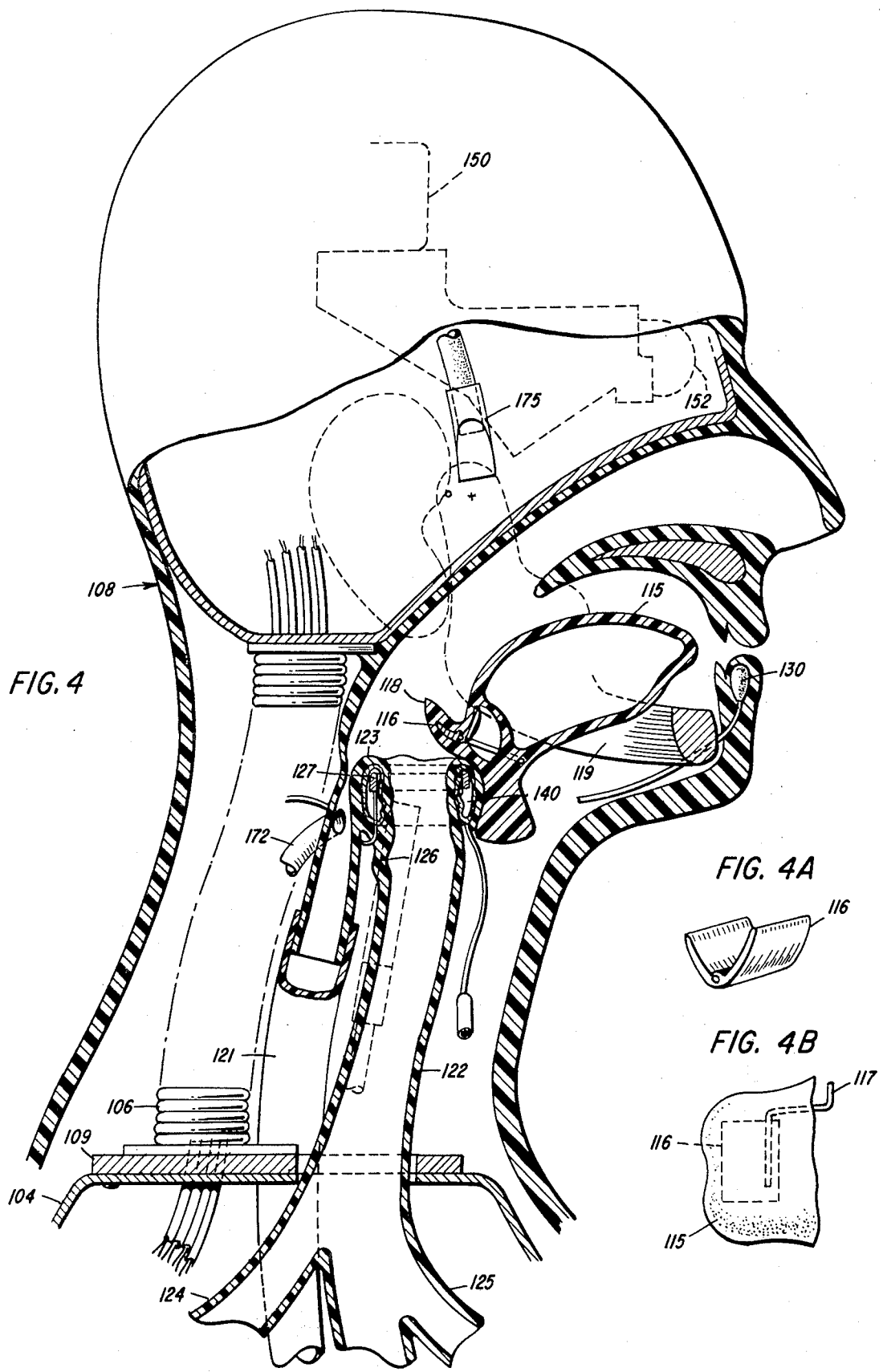

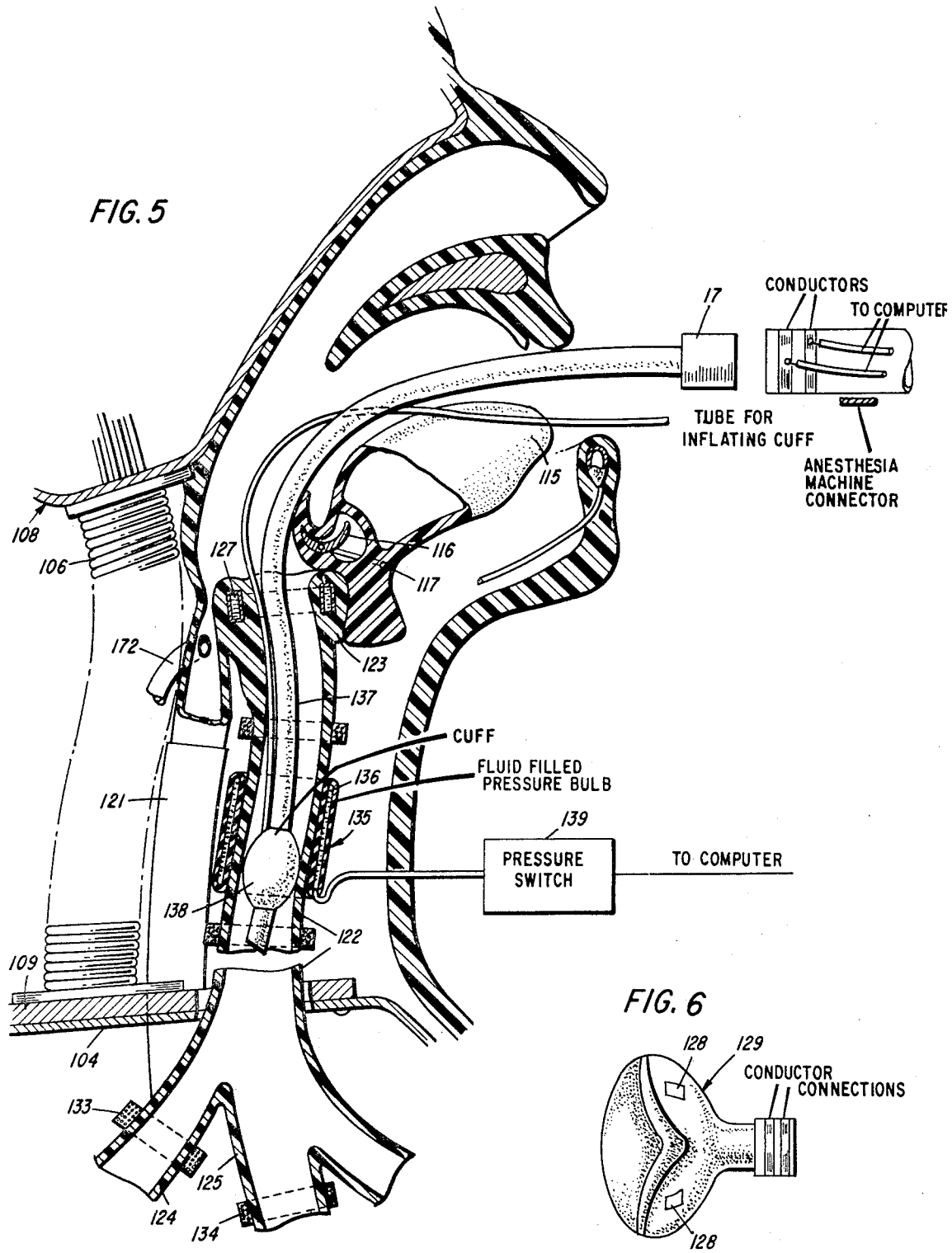

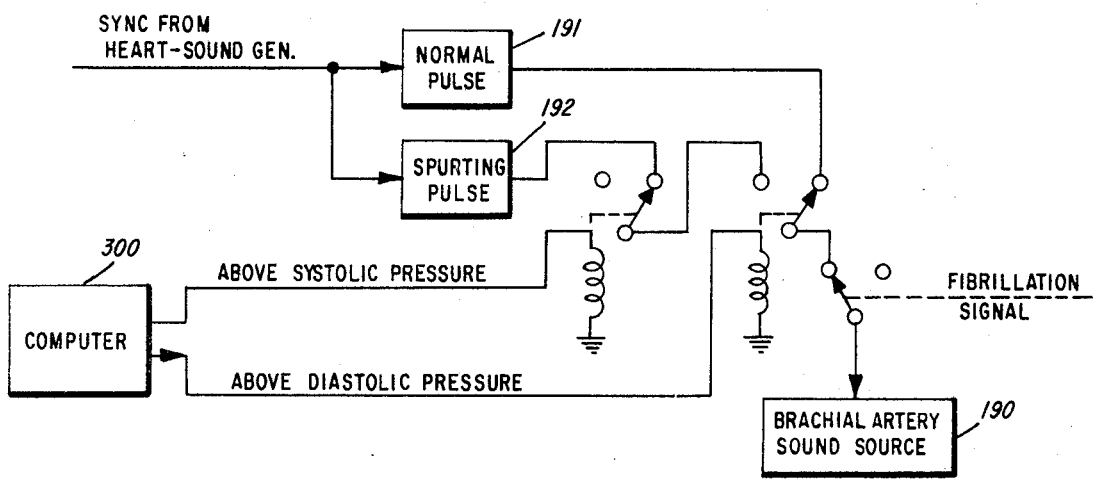
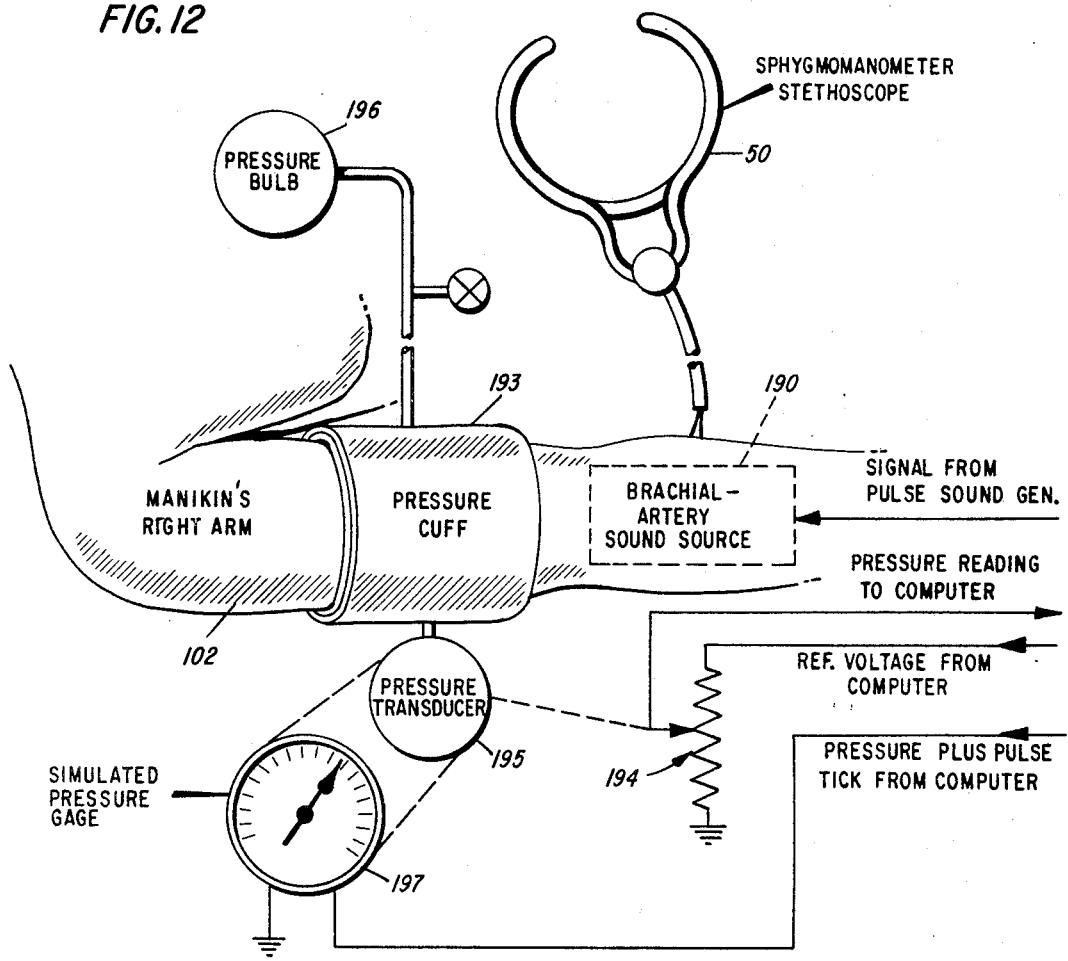

July 14, 1970  S. ABRAHAMSON ETAL  3,520,071
ANESTHESIOLOGICAL TRAINING SIMULATOR
Filed Jan. 29, 1968  11 Sheets-Sheet 11

United States Patent Office 3,520,071
Patented July 14, 1970

3,520,071
ANESTHESIOLOGICAL TRAINING SIMULATOR
Stephen Abrahamson and Judson S. Denson, Los Angeles, Alfred P. Clark and Leonard Taback, Azusa, and Tullio Ronzoni, Pasadena, Calif.; said Clark, said Taback, and said Ronzoni assignors to Aerojet-General Corporation, El Monte, Calif., a corporation of Ohio
Filed Jan. 29, 1968, Ser. No. 701,367
Int. Cl. G09b 23/28
U.S. Cl. 35—17                 19 Claims

ABSTRACT OF THE DISCLOSURE

An anesthesiological training simulator comprising a manikin attached in operating position on its back to an operating table, interconnected with a computer and an instructor's console and miscellaneous instruments, with mechanism in the manikin and associated apparatus allowing all body reactions to appear to take place as might occur during the performance of procedures followed during the administration of anesthesia to a patient undergoing surgery.

---

The present invention relates to a device for use in training anesthesiologists, and has particular reference to a device for simulating the reactions of a patient to the administration of anesthesia and the drugs and techniques connected therewith.

It has been considered possible to improve the efficiency of medical training and to reduce the potential hazards involved in the use of live patients during the teaching process by means of simulation techniques to teach medical skills. In accordance with this concept it is the purpose of the present invention to utilize an articulated manikin with props that will closely resemble a human patient in an operating environment. The patient simulator is designed to react as much as possible as would an actual patient react to certain given stimuli.

The concept of the present invention has been to maximize realism from the viewpoint of the anesthesiologists to include all devices necessary to sense the anesthetist's performance, to display realistic responses to the anesthetist and to the instructor, and to allow the anesthetist to employ the state of the art techniques on the simulator.

Accordingly, the simulator of the present invention consists of three major portions. First there is an articulated manikin capable of a number of life-like responses and having the realistic appearance of a human patient. Secondly, there is included an instructor's console that can completely display the condition of the simulated patient and the progress of the student. Included in the console are override devices enabling the instructor to introduce a wide spectrum of difficulties and to stop the procedure at will. A third part of the simulator is a computer which controls and synchronizes the operation of the simulator. It will accept input signals from the student and instructor, initiate the required control signals to the manikin, and provide the signals necessary to drive the monitoring equipment on the instructor's console.

It is considered that this invention will be of great use in speeding the process of teaching apprentice anesthesiologists by allowing the duplication of actual conditions often encountered in an operating room and allowing the instructor to enter problems for the student and suspend the proceedings if he wishes to discuss a point in the operation. Whereas with a live patient a procedure can be done only once, the simulator of the present invention will allow a student to practice a process dozens of times or immediately redo a procedure and correct his technique.

These as well as further advantages which are inherent in the invention will become apparent from the following description, reference being had to the acompanying drawings wherein:

FIG. 4 is a partially sectioned view of the head and throat area of the manikin;

FIGS. 4A and 4B are detail drawings of the tongue support mechanism;

FIG. 5 is a diagrammatic view of the system of sensors in the area covered in FIG. 4;

FIG. 6 illustrates a simulated face mask;

FIG. 11 is a schematic block diagram of the brachial-artery-sound generator incorporated in the simulator;

FIG. 12 is a diagram of the manikin's right arm with the sphygmomanometer instrument arrangement attached thereto;

Figure 1:
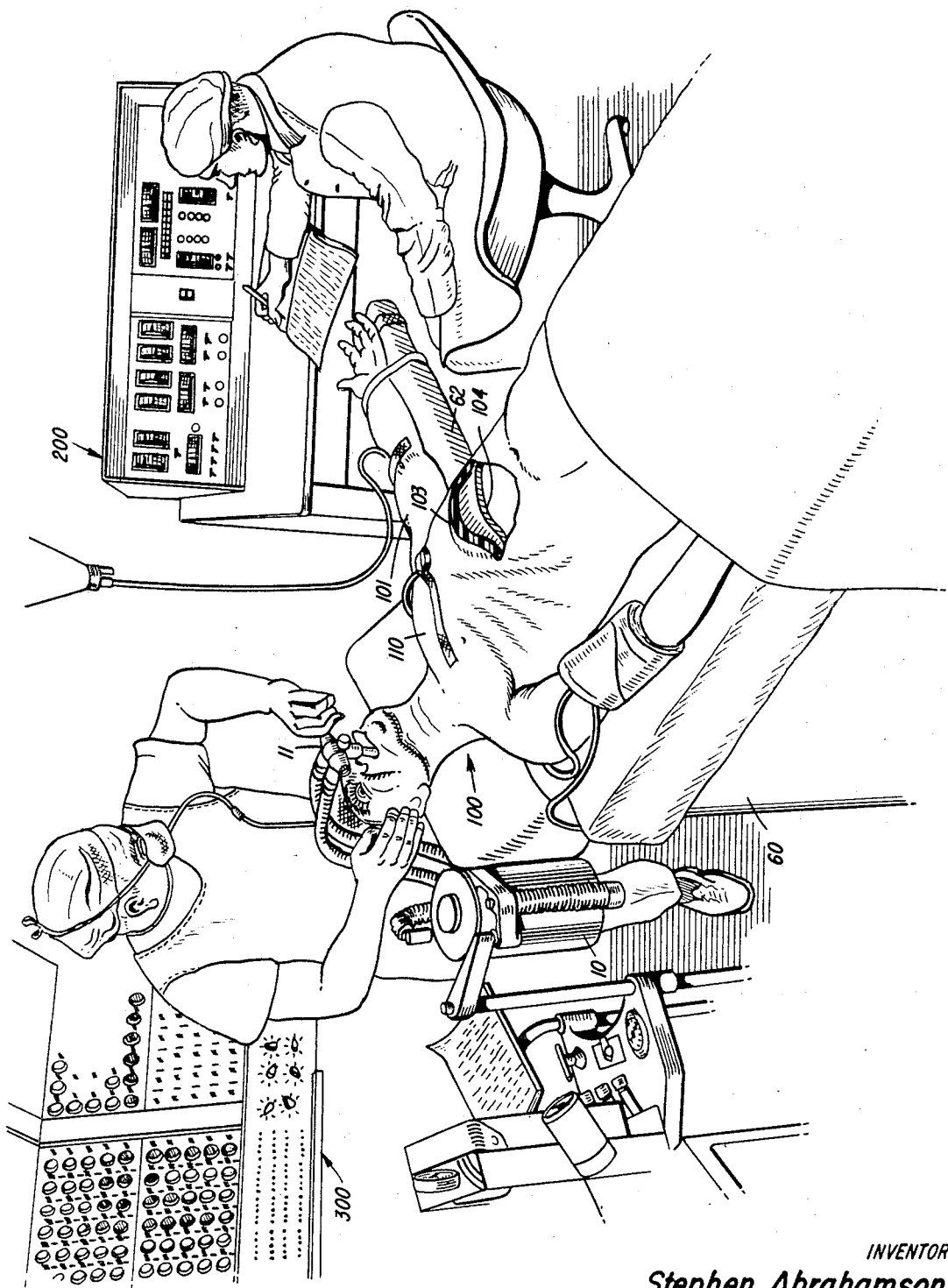
FIG. 1 is a dawing in perspective of the present invention showing generally the manikin on an operating table, the instructor's console, a computer, and miscellaneous equipment used in connection with the present invention with a cutaway portion of the chest to show the structure of the outer covering of the manikin.

Referring to FIG. 1, there is shown in a perspective drawing an overall view of the present invention wherein is illustrated the manikin 100 with its left arm 101 outstretched as in an operating position on an operating table 60 and the placement of instructor's console 200, computer 300 and other machines used in the operating room.

Manikin 100 has the appearance of a human patient in the exposed portion of the body from the hips upward. The remainder of the body supposedly concealed beneath a cover is eliminated in order to enable the easier insertion of machinery required in the upper portion to produce life-like responses. Additional machinery to produce the life-like responses is enclosed in the portion of the operating table beneath the manikin.

Figure 2:
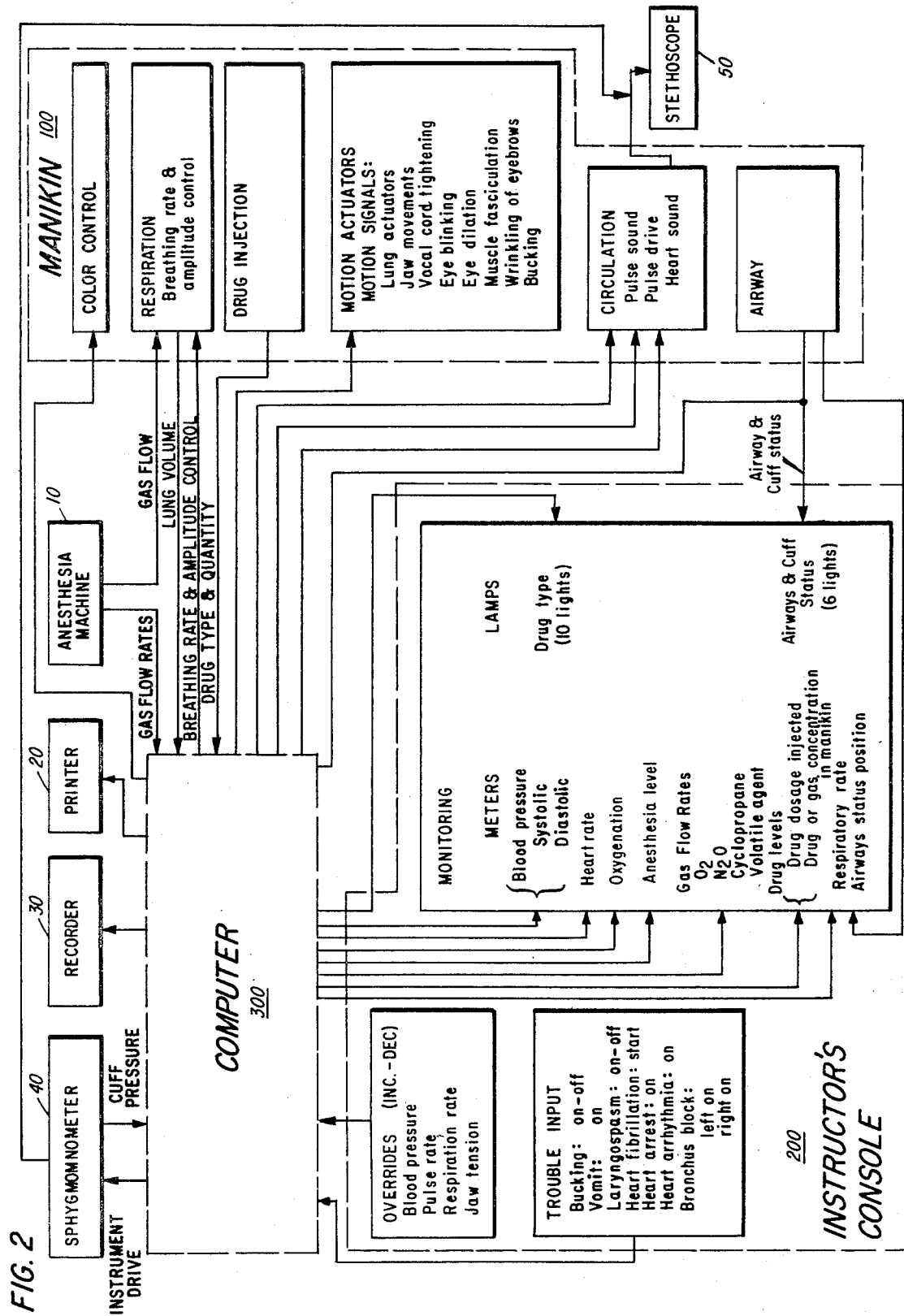
FIG. 2 is an overall interconnection block diagram of the simulator for training anesthesiologists.

FIG. 2 illustrates an overall block diagram of the present invention showing the interconnection of the major units of the simulator including manikin 100, the instructor's console 200 and computer 300. These are the three main units of the present invention, having connected to them an anesthesia machine 10 between manikin 100 and computer 300, and printer 20, recorder 30 and sphygmomanometer 40 connected to computer 300. Sphygmomanometer 40 also has a connection to stethoscope 50 which in turn is also connected to manikin 100.

The manikin 100 of the present invention is capable of the following life-like responses:

(A) the jaw opens and closes;
(B) the tongue partially extends when the jaw opens;
(C) the eyelids open and close and the closing tension is a function of a degree of anesthesia;
(D) the vocal cords open (relax) and close (tense);
(E) the pupils dilate in a continuous change from normal to full dilation;
(F) the eyebrows are capable of wrinkling;
(G) the shoulder muscles are capable of fasciculation;
(H) the manikin is able to breathe normally;
(I) the manikin can simulate bucking;
(J) the carotid and temporal arteries can pulse naturally;
(K) the manikin is able to vomit; and
(L) the aryepiglottic folds can open or close.

In order to allow the manikin 100 to perform these actions simulating human behavior on an operating table 60 it is tied in with a system containing the instructor's console 200 and a computer 300 along with other components of equipment contributing to the operation of manikin 100.

Each of the components of the anesthesiological training simulator device is described below in turn followed by the explanation of the operation and interrelationship of these components.

INSTRUCTOR'S CONSOLE

Figure 3:
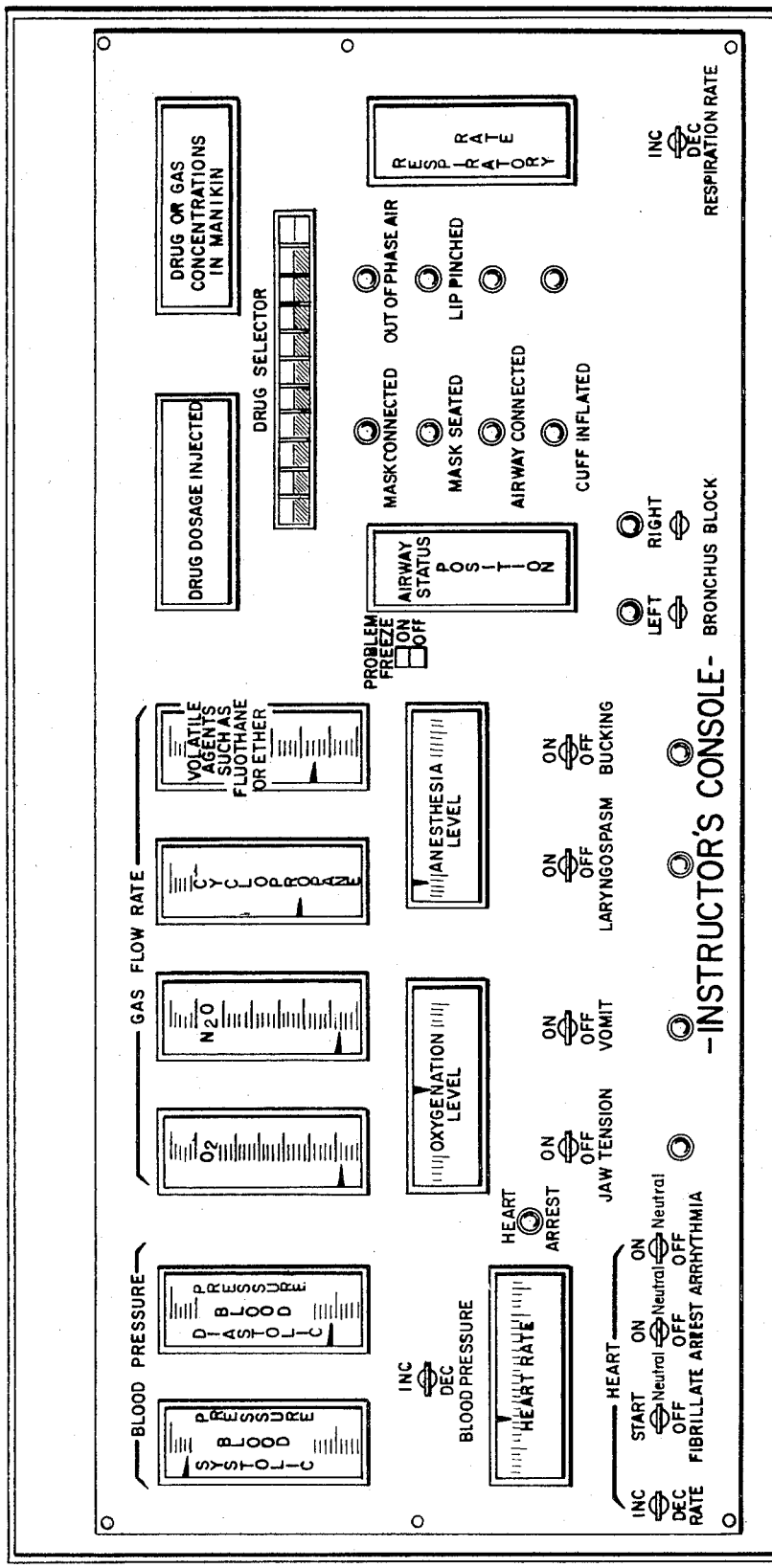
FIG. 3 is a schematic diagram of the instructor's console control panel showing the dials, indicator lights, and controls thereon.

In conjunction with the manikin 100 and the computer 300 there is the instructor's console 200 which enables an instructor to monitor reactions of the manikin 100 and the computer 300 inputs to the manikin 100 and from the manikin 100, to override the outputs of the computer 300, and to insert further trouble inputs through the computer 300 to the manikin 100 to create additional problems for the student. In regard to the monitoring devices on the instructor's console 200 there are meters and lamps to indicate a number of conditions such as blood pressure, heart rate, oxygenation level, anesthesia level, gas flow rates, drug levels and types, respiratory rate and airway and cuff status and airway position. The meter readings and lamp indications are listed in the block diagram of FIG. 2 and their positions on the instructor's console 200 are shown in FIG. 3. In addition, the dials for overriding certain conditions and either increasing or decreasing the readings of blood pressure, pulse rate, respiration rate and jaw tension are also listed on FIG. 2 and shown in their position on the instructor's console 200 in FIG. 3. In a like manner the switches for putting in a trouble input such as bucking, vomit, laryngospasm, heart fibrillation, heart arrest, heart arrhythmia and bronchus block to either the left or the right lung are also listed in the interconnection diagram of FIG. 2 and located on the instructor's console 200 in FIG. 3. The operation of the dials, switches and lights is discussed in connection with the operation of appropriate portions of the simulator training device system.

THE MANIKIN

The manikin 100 generally shown in perspective in FIG. 1 is constructed of a nominal one-quarter inch thick plastic skin 103 covering a shell 104 which houses the simulated body parts and sensors. Actuators housed therein are connected to the external computer 300 that is programmed to trigger the manikin's physiological reactions.

The manikin 100 has all mouth and throat structures found in the real human including teeth, tongue, vocal cords, and bronchial tubes. The eyes are connected so as to blink and the pupils dilate in response to the injection of several simulated drugs. The manikin 100 also has a heart beat, carotid and temporal pulse beats, blood pressure, and diaphragm and chest motion as he "breathes."

Various mechanisms inside the manikin 100 are pneumatically actuated and controlled by electro-pneumatic transducers. Signal voltages to the transducers are generated in computer 300 as a reaction to the student inputs.

Although the term "pneumatic" is used in the specification as an example, it should be considered that other fluids may also be used and these systems do not necessarily all have to be restricted to pneumatic operation.

Heart and artery sounds are electronically generated and can be heard through stethoscope 50. A number of sensors detect possible lip pinching, positioning of the airway tube in the trachea, and type and amount of intravenous drug injected. For example, the sensors consisting of face mask sensor indicate proper mask placement. A lip pressure sensor 130 which comprises a fluid-filled neoprene bulb in the lower lip, and a pressure switch indicate excessive pressure against the lip.

Details of the internal portions of the neck and throat of manikin 100 can best be seen in FIG. 4. A hollow spine 106 provides semi-rigid head support and is structurally attached to shell 104. Because manikin 100 need not include hips, legs, and mid-back section for its present purpose, access is allowed for all actuating linkages, electric wires and feeder tubes which are routed through spine 106 to parts of head 108. The back opening of shell 104 is bolted to the top of operating table 60 since manikin portability is neither necessary nor desirable except in conjunction with the whole operating table. In this regard, operating table 60 is provided with locking casters to provide mobility and shelves (not shown) underneath the table surface for supporting mechanisms connected to manikin 100.

In the particular version of the present invention, the skull of manikin 100 is fabricated from fiberglas-filled polyester resins formed in a plaster mold which in turn was formed on a clay mold. Room temperature cure was effected, although heat was used to accelerate the process in areas where thickness for reenforcement was desired. The occipital area of the skull is slightly enlarged over normal to accommodate some internal mechanism. A flexible convoluted steel tubing at the spine 106 is utilized to give spinal support to the neck area. This tubing 106 also serves as a conduit for the pneumatic tubing and wiring from the head area. In the shoulder area conduit 106 is fastened to shell 104 by a base plate 109 through which tubing 106 and wiring contained therein extends to actuators and a power supply in the base of the operating table 60. Through the use of conduit 106 acting as a flexible steel spine, lateral movement and rotation of the head is provided.

Chest cavity 110 with shell 104 supporting the outer plastic covering 103 of "flesh and skin" can be constructed of polyester resin reenforced with Fiberglas cured at room temperature. Chest cavity 110 is comprised of two sections joined at a flexible center. The abdominal area 111 is supported by a separate movable section. Structural support in this area also encompasses the lung and abdominal actuation.

The arms 101 and 102 may be composed of a polyurethane foam covered by a polyvinyl chloride skin with pigmentation and touch-up added for realism. In order to support the left arm 101 of manikin 100 an arm support 62 is attached to the table surface of operating table 60.

Referring again to FIG. 4, in the area of the mouth and throat of manikin 100 there is located the tongue 115, which is connected in head 108 to the manikin 100. By means of a lever 116 molded into the tongue structure 115 and a piano wire 117 connected thereto which attaches the tongue 115 in position so that the epiglottis 118 folds down when the tip of a laryngoscope is pressed against the junction of the epiglottis and the tongue. Details of lever 116 and wires 117 connection are shown in FIGS. 4A and 4B.

The jaw 119 in its normal position presenting a separation between upper and lower front teeth is pivotally mounted on floating tapered nylon mandible bearings which are individually spring loaded and suspended within an axially slotted tubular housing. The details of this construction are not shown. The jaw 119 is pneumatically controlled to have a maximum biting force of ten to fifteen pounds and an anticipated force during manual manipulation of approximately two to three pounds.

Also located in this area is polyvinyl tubing used for simulating the esophagus 121 and trachea 122 and connected so as to pass through base plate 109 to stomach and lung bellows, respectively (not shown).

A system of sensors is also located in this area and shown in the schematic diagram of FIG. 5. A pressure sensor 130 is located in the lower lip to measure the pressure exerted against the lip downward against the lower teeth. Such a sensor 130 may be either a fluid pressure bulb connected to a pressure switch or a strain gage type of sensor. In addition, sensor 127 is located along the trachea 122 in the aryepiglottic fold 123 and sensors 133 and 134 on both bronchi branches 124 and 125. The sensors 127, 133, and 134 are of an inductor coil type which are activated by the insertion of endotracheal airway 137. The airway 137 is especially constructed of a magnetic material which affects the indicator sensors which consists of coils which are so connected in an oscillator circuit as to cause a change in the amplitude of the oscillator output voltage which will vary in acocrdance with the depth of insertion of airway 137.

An additional sensor 135 located in the trachea 122 is used to obtain an indication of proper inflation of cuff 138 on the trachea airway tube 137. A fluid filled pressure bulb 136 is installed around the flexible trachea 122 and upon inflation of the cuff 138 the fluid is forced along a tube to a pressure switch 139 which in turn is connected to activate a light designated "CUFF INFLATED" on the panel of the instructor's console 200.

Since the manikin patient 100 can also breath the gas from anesthesia-machine 10 through a face mask, a simulated face mask 129 is shown in FIG. 6. This mask has magnets 128 located thereon which in cooperation with magnetic sensors placed in the face of the manikin 100 will operate magnetically actuated reed switches that close when the mask is properly placed. Indication from the switches is then communicated to computer 300 and also to the instructor's console 200.

Figure 7:
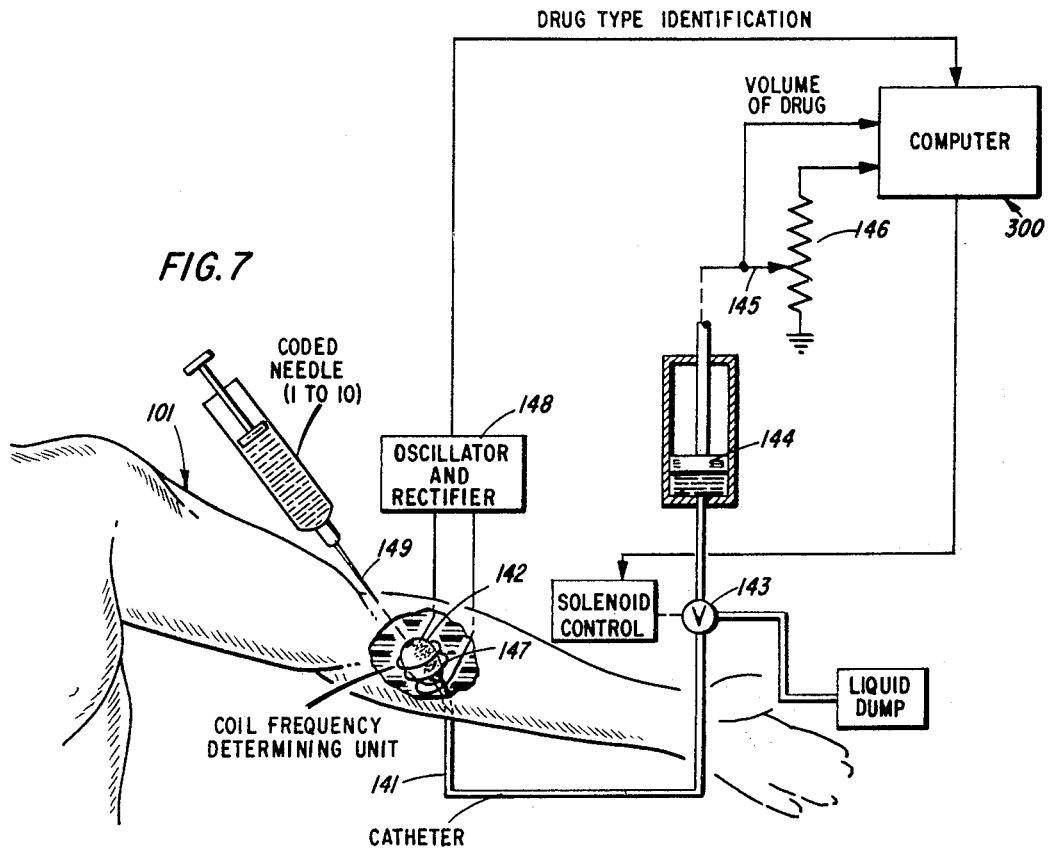
FIG. 7 is a schematic diagram illustrating drug concentration monitoring devices in the left arm of the manikin.

Additional sensing equipment is located in the manikin's left arm 101 as shown in the schematic diagram of FIG. 7. This sensing equipment is built into the manikin's arm in order to monitor the type and quantity of drug injected into the arm 101 and to feed this information to computer 300 which in turn feeds it to the instructor's console 200. An intravenous catheter 141 located in place in the manikin's arm 101 is connected through tubing and through a solenoid controlled valve 143 to a piston 144 which in turn operates the control arm 145 of a potentiometer 146. A coil 147 is wound around the injection bulb 142 of catheter 141 and this coil 147 is connected to the circuit of an oscillator and rectifier 148. Each of the hypodermic needles 149, in the present case ten different ones to conform to the number of drug selector lamps on the instructor's console 200, may be injected into the bulb 142 of the catheter 141. The voltage amplitude of the oscillator 148 will be determined by the amount of ferrous material contained in the needle 149 and the different drugs will be uniquely identified by the amplitude differences which are registered in the output of the oscillator 148. At the same time the fluid from the hypodermic needle 149 which is injected into the catheter 141 will travel through a tube and through the solenoid controlled valve 143 to the piston 144 driving the control arm 145. The displacement of the control arm 145 of the potentiometer 146 then represents the injected volume of the drug. Combined signals from the resistance potentiometer pickoff 146 and from the oscillator 148 will be utilized by the computer 300 to indicate unique drug injections. After the hypodermic needle 149 is withdrawn the computer 300 actuates the solenoid controlled valve 143 which dumps the injected fluid in preparation for the next injection. The computer 300 then determines the effect of the injected dose.

As discussed above, the sensor in the manikin 100 disclose the actions of the student using the simulator device to the instructor at his console 200, and in addition, feeds this information to the computer 300 which then controls the reactions of the manikin 100.

Among these reactions are those which are caused by motion actuators located in the manikin 100 which are activated by signals from the computer 300.

Figure 8:
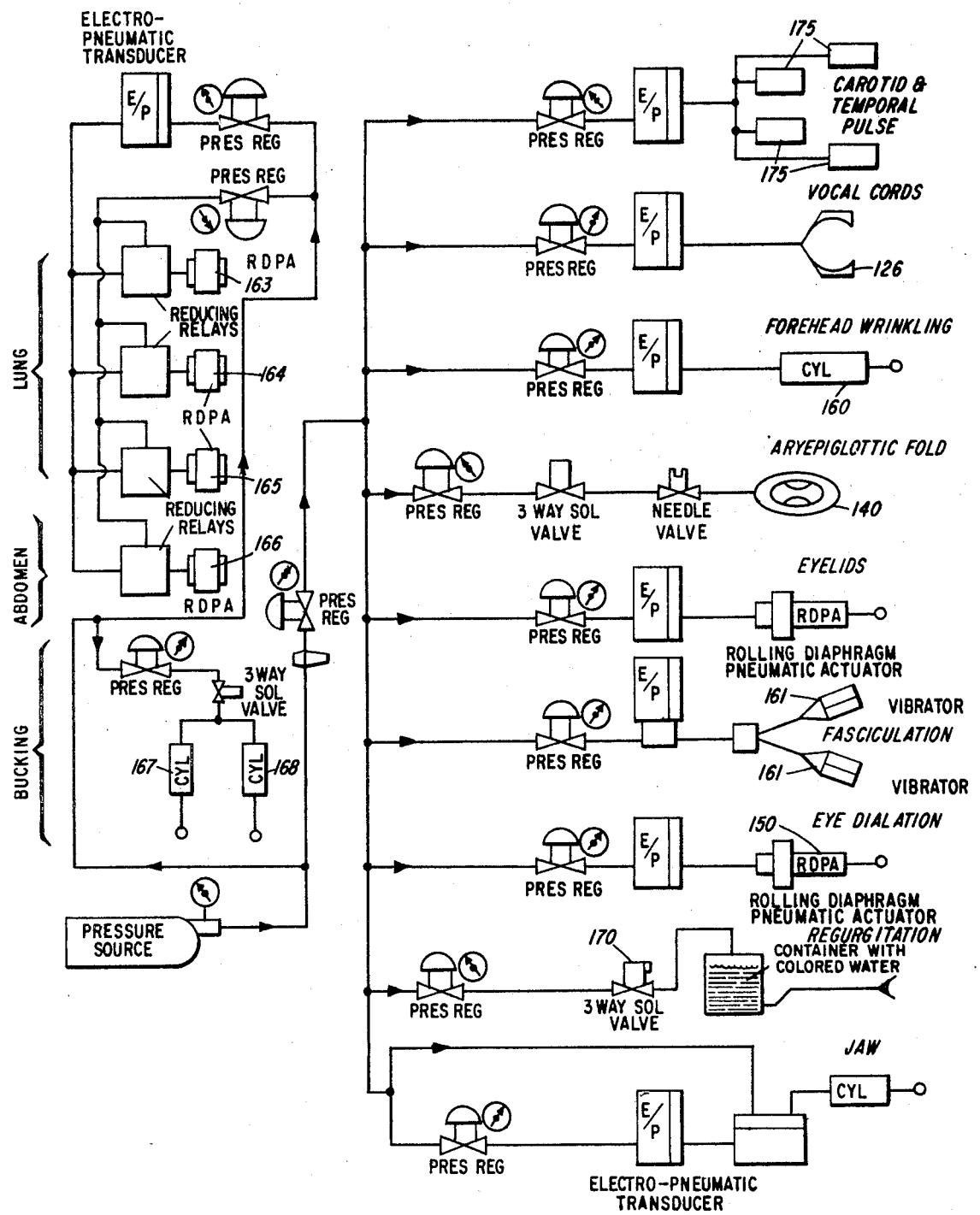
FIG. 8 is a schematic diagram of the pneumatic system involved in motion actuation of the manikin.

The electrical signals transmitted from the computer to the manikin in response of either signals having been fed from the manikin 100 to the computer 300 or signals injected by the instructor at console 200 for inserting an additional problem to the student, control the operation of the pneumatic system shown in the schematic diagram of FIG. 8. As can be seen from that drawing, a supply of fluid under pressure can be fed to lines controlling movement in different portions of manikin 100. The actuation of the articulations of manikin 100 in the system shown in FIG. 8 are as follows:

(A) The jaw may be opened and closed on a pivot in one plane only, by movement of the lower jaw 119. The lower jaw 119 has a neutral position when no actuation signal is received with a small space between tooth tips. In this condition the jaw offers a minimum resistance to manual movement and returns to the neutral position in a natural way when released unless restrained by a bite block or similar item. A proportional D.C. signal received from the computer 300 will provide a varying tension on the lower jaw which causes a mechanical resistance to the manual jaw opening to increase and the jaw to gradually close unless mechanically restrained. After the jaw is closed, a further increase of the "tenseness" signal increases the force required to manually open the jaw until it is no longer possible to force the jaw with normal manual force.

(B) Vocal cords 126 positioned along the trachea 122 form a larynx control which is actuated through a proportional D.C. signal providing continuous control of vocal cord opening; from fully opened to fully closed, under control of the vocal cord larynx position signal. When fully closed the combined resistance of the structure and actuator is such as to prevent introduction of the airway past the vocal cords. The electrical connections are made so as to produce a gradual change taking place in a small but finite time. A separate two level D.C. on-off signal will cause an inflatable boot 140 in the aryepiglottic folds to cause the folds to close over the vocal cords from a normally open position.

(C) Eyelid tension is controlled by a proporfional D.C. signal providing varying tension on the eyelids and providing closure and opening of the eyelid. Eyebrow displacement follows the eyelid movement. With no actuation signal applied the eyelids assume a neutral position of fully open. The application of a varying tenseness control signal causes the eyelids to increase tenseness and gradually close. Further increase in the tenseness signal causes an increase in the force required to open the eyelids. A still further increase in the signal causes the brow to "pull down" toward the eye sockets. Upon removal of the tenseness signal, the eyelids "snap" back to the fully open position. The actual mechanical movement which is controlled by the electrical signal takes place under the control of a rolling diaphragm pneumatic actuator. The frame within the eyelid is of steel, covered by the polyvinyl chloride skin. Attachment of the eyelid material is made to the contingent superorbital skin area. In the alternative, a separate lid assembly similar to a doll's eye could be used for the mechanical connections. However, a feature of the eyelid action is the increased closure force but it should be noted that this force is somewhat greater than that which would be encountered in a living patient.

Also a dual unit is incorporated into the manikin 100 allowing the manual opening of each independent lid.

Figure 9:
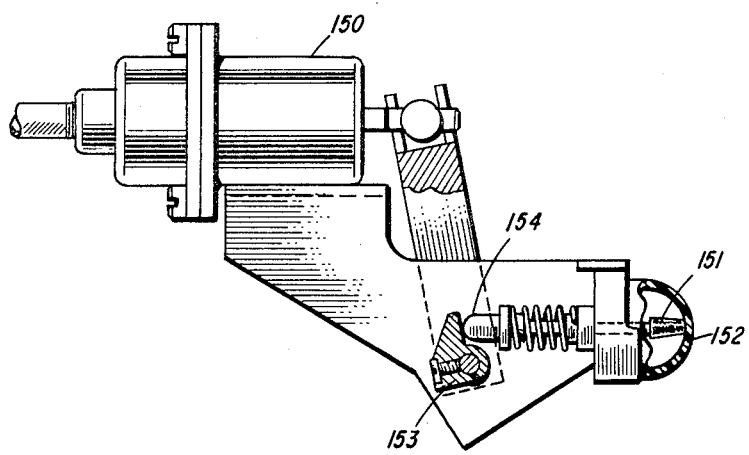
FIG. 9 is a partially sectioned view of the actuation mechanism for dilating the pupils of each of the eyes of the manikin.

(D) The pupils of the eyes are actuated with a proportional D.C. position control signal for dilation of the pupil of the eye in order to provide a continuously variable pupil size. Upon actuation of the pneumatic actuator 150 the mechanism for pupil dilation, shown in FIG. 9, takes effect. Between the ranges of substantially 2 to 8 mm. dilation diameter of the eye pupils is accomplished through transfer of the piston motion of actuator 150 through cam 153 and follower 154 to the pneumatically controlled black neoprene dilator (plunger 151 which presses the neoprene plunger 151 against the inside of the plastic eye form 152. The greater the pressure from the pneumatic actuator 150, the more the cone tip 151 is flattened thereby changing dilation diameters. The color of the iris can be obtained by a mixture of Grumbacher permanent pigments thoroughly mixed in a white vaseline base. The color mixture can include manganese blue, cerulean blue, zinc white and Paynes gray. With this mechanism the speed of response of a diameter change is relatively rapid, i.e. in the order of a tenth of a second.

(E) The eyebrows and the forehead are capable of wrinkling under control of a proportional D.C. signal which causes the skin of the forehead to wrinkle varying amounts from a normal unwrinkled position. The eyebrow is so attached so as to follow the forehead wrinkle. The motion of the eyebrow as the tenseness of the forehead is increased is away from the eye sockets as opposed to the brow action under eyelid tension. Removal of the forehead tenseness signal causes the forehead and brow to assume a relaxed, unwrinkled condition. The actual movement controlled by the signal is accomplished for the forehead wrinkling by controlling a pneumatic spring loaded cylinder 160 attached to a flexible push-pull cable. The brow tension toward the eyes is accomplished in conjunction with the eyelid tightening by an override spring mechanism.

(F) Shoulder twitching or rippling also known as fasciculating is under the control of a two level D.C. on-off signal. Presence of this signal causes twitching while removal of the signal causes the twitching to cease and return of the control to normal at rest condition. One of the methods of mechanically producing the twitching action through connection to the on-off electrical signal is through the use of a type of high amplitude low frequency vibration which may be produced through a variety of different types of vibrators 161.

(G) The motion of the chest wall is obtained by providing internal structures simulating the operation of the human lungs. The left lung consists of a single lobe. The right lung is simulated by two lobes; the upper lobe accounting for approximately one-third of the volume with the remaining two-thirds in the lower lobe. The lobes are connected to the trachea 122 through the bronchi 124 and 125 with two of the lobes connected to bronchus 125 and a single lobe to bronchus 124. During normal breathing the drive mechanism expands and contracts all lobes at a rate and amplitude determined by computer control signals. Independent motion of the lungs is required so that the effects of blocking a lobe with the airway 137 result in appropriate changes in chest motion. In addition, a resilient chamber is connected to the esophagus 121 to simulate stomach motion which may be caused by insertion of the airway 137 into the esophagus 121 by error. Both left and right side lobes are instrumented so that lung volumes may be ascertained. The behavior of the lungs and chest is under program control and when normal breathing ceases, response is made to artificial ventilation by the student. The abdomen moves up and down in synchronism with the motion of the lungs during normal breathing. Independent motion of the abdomen is possible. The control design makes provision for artificial ventilation with the lungs moving naturally in response to pressure generated by the anesthesia machine 10.

A simulated obstruction in each of the bronchus tubes 124 and 125 makes it possible to close off air flow to either or both of the lungs upon a command signal of a two level D.C. on-off type which is actuated by the instructor from his console 200. The controls for either a left bronchus block or a right bronchus block (FIG. 3) will cause blockage of either one of the bronchial tubes 124 or 125. The tubes are returned to a fully open indicated position upon signal removal. Actual movement of nylon reenforced neoprene bellows which constitute the three lung lobes and movement of the chest of the manikin 100 takes place through pneumatic rolling diaphragm type actuators 163 through 166 connected to the shell of the chest cavity 110 and abdomen portion 111 of the shell 104 so as to cause motion upward and downward.

(H) The manikin 100 is also mechanized to simulate a bucking motion. A two level D.C. on-off signal put in by a switch operated on the instructor's console 200 causes the shoulders to raise slightly and the abdomen to jerk up similar to a cough. This motion is continued until removal of the bucking signal which while continued in the "on" position operates two pneumatic cylinders 167 and 168. One of the cylinders is mounted under the shoulders and the other near the hips. The two cylinders 167 and 168 are operated together by the signal thereto moving those parts of the body upward.

(I) A vomit signal of a two level D.C. on-off type causes simulated vomit fluid to issue from the esophagus 121 upon actuation of the control on the instructor's console 200. When the signal is actuated the valve 170 allows pressure to be applied to a colored fluid in a container 171 which is then expelled through a tube 172 connected at the entrance of the esophagus 121. The action of retching may be produced by the simultaneous application of a bucking signal with the vomit signal.

(J) Carotid and temporal pulsing is presented by means of flattened, sealed vinyl tubes 175. The two systems (carotid and temporal) are manifold connected to permit each pulse system independent operation. Rate and amplitude variations are effectively developed through use of an electro-pneumatic transducer which receives signals from the heart-sound generator of FIG. 10. The generation of that signal will be described in connection with further discussion of FIG. 10.

Although pneumatic operation is discussed above, the supply pressure in a number of cases could be hydraulic in the alternative and therefore the system may be considered a fluid pressure operated system controlled through electrical signals fed thereto.

In addition to the motion actuation of the manikin 100, other electrical signals produce types of actuation of the manikin not connected with motion. Of these there is a color actuation system which may be installed on the manikin 100 to be controlled by a computer generated signal indicating the state of oxygenation of the simulated patient which causes the skin on parts of the upper body, face, and internal throat to change colors; normal color is a reddish pink. Upon application of an anoxia signal the color will change gradually to bluish and finally to ashen gray. Removal of the signal causes the color to return to normal healthy coloring. Materials of the throat, face and ear lobes are selected such that the color changes are more rapidly apparent in the simulated mucus membranes of the throat and the ear lobes and on the external facial covering. A number of methods may be used to obtain this coloring such as the use of sub-miniature light bulbs, fiber optics and fluorescent electro-luminescent tape. All of these are subject to electrical control and therefore may be controlled by the signal from the computer 300.

The operating table 60 also contains audio transducers which produce a sound for detection by the student in his anesthesiological procedures. Such actuators consist of heart sound and brachial artery monitoring in the form of two small head set transducers 180 and 190 whose tubular outlets are located in the left chest area and the right arm respectively.

Figure 10:
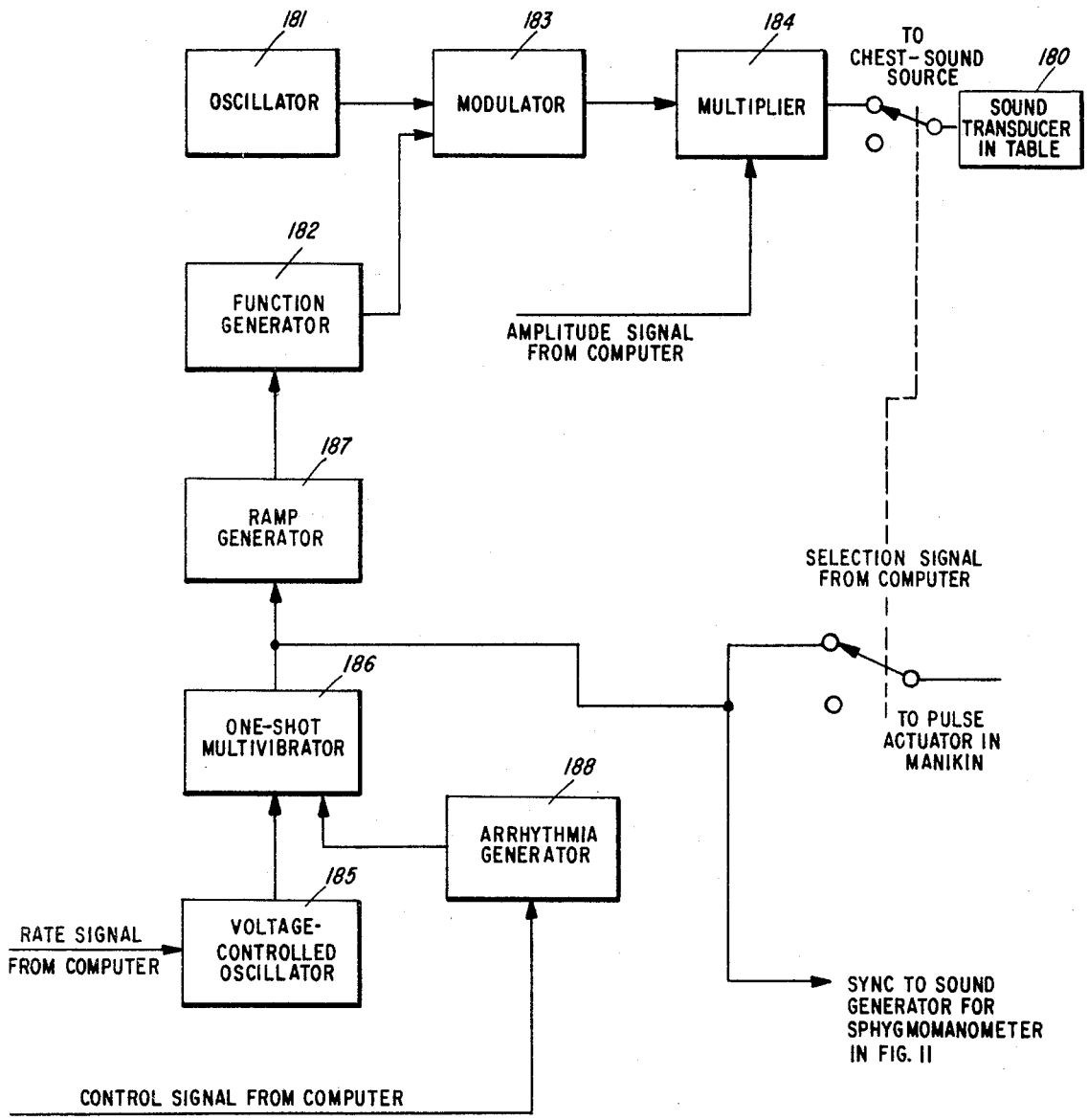
FIG. 10 is a block diagram of the heart-sound generator included in the simulator of the present invention.

The means for generating the heart sound through the transducer 180 whose tubular outlet is located in the left chest area is shown in block diagram form in FIG. 10. The heart sound is simulated by properly modulating the amplitude of a fixed frequency oscillator 181. The amplitude profile of the heart sound is obtained by adjusting the function generator 182. The output of the function generator 182 and the output of the oscillator 181 will be fed to the modulator 183. The modulator 183 output will thus be of fixed amplitude and have the proper sound characteristics. Signal amplitude will be kept under computer 300 control by feeding the control signal from computer 300 and the modulator 183 signal to the electronic multiplier 184.

The heart rate is computer controlled in the following way. The rate signal from computer 300 controls the frequency of a voltage controlled oscillator 185. The output of oscillator 185 drives a one-shot multivibrator 186, whose output is shaped to appropriately drive the function generator 182 by the ramp generator 187. Arrhythmias may be simulated by generating appropriate extra or missing heart beats in the arrhythmia generator 188, which is turned on and off at the correct times by a control signal from computer 300. The output of the one-shot multivibrator 186 is also used to drive the pulse mechanism in the manikin 100 to insure synchronism. In addition, it provides a synchronization signal to the sound generator for the sphygmomanometer.

Fibrillation is simulated by disconnecting the heart-sound generator from the sound transducer 180. The drive signals to the pulse actuator and the transducer 190 in the arm will be switched to appropriate signals simultaneously under computer control.

FIG. 11 shows the arrangement in schematic block diagram form for simulating the brachial-artery sound during a blood pressure measurement. Two sound sources are used; one a normal pulse sound generator 191 and the other a spurting or Korotkoff pulse sound generator 192. Both these sources are synchronized with the heart rate sync signal obtained from the heart-sound generator of FIG. 10.

The generator which is used in driving the brachial-artery sound source is selected by comparatives within the computer 300. If the cuff pressure in pressure cuff 193 shown in the sphygmomanometer instrument arrangement on the manikin's right arm 102, as shown in FIG. 12, is above diastolic but below systolic, a comparator will select the spurting pulse generator 192. When the cuff pressure reaches or exceeds systolic, both sound generators 191 and 192 are disconnected.

A fibrillating heart signal from the instructor's console 200 will also cause disconnection of the brachial-artery sound generators 191 and 192. The sphygmomanometer instrument arrangement shown on the right arm 102 of the manikin 100 in FIG. 12 allows a reading to be taken directly from a resistance potentiometer 194 integral to the pressure transducer 195. The transducer 195 is driven by an actual hand bulb pump 196 attached to pressure cuff 193 which is placed around the manikin's upper arm 102. The transducer 195 may be placed internal to the manikin 100. The simulated pressure gage 197 is a voltmeter that is controlled by the computer 300. A simulated pressure pulse, operated in synchronization with the pulse rate, is added to the static blood pressure by the computer 300 and causes realistic pulse flutter of the meter 197. A signal from the actual pressure transducer potentiometer 194 is used by the computer 300 to compute the cuff pressure in pressure cuff 193. The tubular outlet of the brachial-artery sound source 190 is located in the arm 102 and supplies sound to the anesthetist's stethoscope 50. These sounds are controlled by the computer 300.

THE COMPUTER

Figure 13:
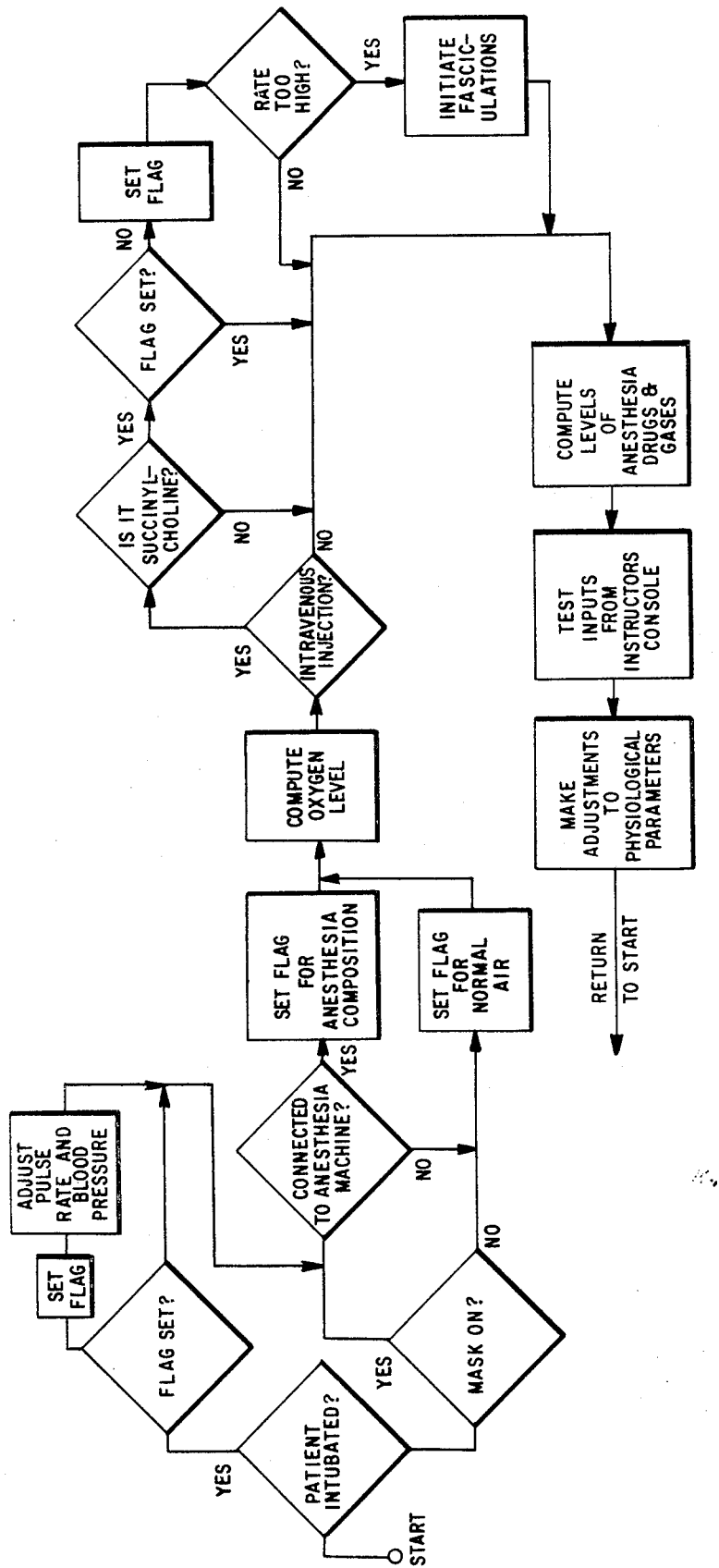
FIG. 13 is a computer logic flow chart for operation of the simulator.

A commercially available computer is used which has been set in conjunction with the signal outputs previously discussed. For the operation of a procedure of anesthetizing a patient a flow chart of the computer logic is shown in FIG. 13. This form of documentation is usually associated with digital operations but has been selected here for clarity of presentation. Both digital and analog techniques are used.

The computer 300 first determines whether the patient has been intubated. If so, it will determine if this is the initial insertion of the airway 137. If it is the initial insertion, the computer 300 will adjust the pulse rate and blood pressure according to a predetermined program. If it is not, this step is omitted. If the patient was not intubated, the computer 300 will determine whether the face mask 129 is in place. If either the mask 129 or the airway 137 is in place and connected to the anesthesia machine 10, the computer 300 will set the proper flag so that the gas composition used in the calculations will be that determined from the valve settings of the anesthesia machine 10. If neither the mask 129 nor the airway 137 is in place, or if the anesthesia machine 10 is not attached, a flag is set so that normal air is used in the calculations. The state of oxygenation is then determined. The computer 300 will next test for intravenous injections. If succinylcholine has been injected, the computer 300 will determine if it is the initial dose. If so, the rate will be evaluated; if too high muscle fasciculation will be initiated after the proper delay and for the proper duration. If this was not the initial injection, this procedure will be omitted.

The computer 300 will next calculate the level of anesthesia from both intravenously injected drugs and inhaled gasses. It then tests for any inputs from the instructor's console 200. On the basis of previous calculations of oxygen and anesthesia levels and instructor's console inputs, the computer 300 will adjust the physiological parameters of the manikin 100. These parameters include heart rate, blood pressure respiratory rate and clues for consciousness level. The computer 300 program then repeats itself.

The digital program in computer 300 consists of a monitor which performs essentially two functions involving:

(a) Timing

Time in the computer is kept by a real-time clock which interrupts the program at predetermined intervals. The monitor controls the operation of the clock. At each interval the monitor determines which subroutines are to be performed and directs the computer to perform them.

(b) Subroutines

The monitor is the controller for sequencing the operation of the subroutines. In general, each subroutine consists of two parts. The first part is an initialization procedure which is performed only once for a particular program run. The second part is performed as often as required, based on the physical situation.

There are two kinds of subroutines. One type is a special subroutine which applies to a particular physical situation in a particular problem. The second type is a utility subroutine which performs some mathematical or logical functions and which may be used by other programs and also may be called upon by the first type of subroutine. The subroutines described below are divided into the two types. The names of the subroutines are the symbolic names used in the calling sequence by the monitor.

(1) Special subroutines

NEDL—This routine handles the input of injectable drugs. There is provision for up to 10 different drugs as determined by the needle which is used to inject the drug. The routine determines which drug is injected and the amount injected by hypodermic needle 149. A calculation is made of the cumulative dose for each drug. The cumulative doses are stored in memory delay lines and are available a predetermined time (20 seconds) later. The routine also controls the valve 143 which allows the injected liquid to be discharged from the measuring piston 144.

DRUG—This routine handles the output from NEDL. Given the delayed cumulative dose as input, the effective or visceral concentration of the injectable drugs are computed in accordance with their appropriate transfer functions. This routine also computes the anesthesia level which is a function of the effective concentration of $N_2O$, Pentothal, and Cyclopropane.

CIRC—This routine calculates the circulation rate, the pulse rate, and the systolic and diastolic pressures. The input parameters which affect these calculations are manual blood pressure and manual pulse rate inputs, $O_2$ and $CO_2$ concentration, Vasopressor drug injections and the anesthesia level. This routine outputs the required actuation signals for the manikin 100.

RESP—This routine computes breathing rate, breathing amplitude, a simulated ventilation rate, and effective concentration of $O_2$, $CO_2$, $N_2O$, and Cyclopropane. The inputs are flow rates of all gases including $O_2$, Air, $N_2O$, and Cyclopropane and lung position measured in the manikin 100. Additional parameters affecting the calculations are effective concentrations of Pentothal and Succinylcholine, circulation rate, and anesthesia level. These parameters are provided by the other subroutines. Appropriate signals and voltages to control the manikin 100 are output.

(2) Utility subroutines

ANIO—This is a general input-output routine for communication with the analog computer. Its input parameters are: the first address of a block of memory cells to be input or output, the first address of a block of constants which scale the input or output, the determination of whether input or output is to be performed, and the first and last channels to be used. The transfers may optionally be made without scaling.

LEAD—When called at a fixed time interval, this routine iteratively implements a transfer function of the form:

$$\frac{e_0}{e_i} = \frac{s}{sT+1}$$

This routine is used in the calculation of effective drug concentrations.

LAG—When called at a fixed time interval, this routine iteratively implements a transfer function of the form:

$$\frac{e_0}{e_i} = \frac{1}{sT+1}$$

This routine is used in the calculation of effective drug and gas concentrations.

FUNC—Given an arbitrary function $y=f(x)$, which is stored as discrete values of $x$ and $y$, this routine determines the value of $y$ for any value of $x$ within the range of $x$ defined in the table of values. The routine performs linear interpolation between points. The inputs are the value of the independent variable $(x)$ and the first address at which the table is stored in memory. The first address of the table contains the number of points stored. Negative values of $x$ may be input if they are defined.

DLAY—This routine implements a transport delay. It accepts an input from one of ten sources, stores this input in a memory "delay line" and outputs the stored input a predetermined time later. The inputs to the routine are the number to be stored and the number of the delay line to be used. The value of the inputs are not changed by the routine.

The empirical equations describing the relations between inputs to the simulated patient and the output reactions are worked into the computer 300 but are not included here. These equations were implemented as a hybrid analog-digital computer simulation and the results of various inputs are plotted on a strip chart recorder 30 as a function of time.

Recorder 30 and printer 20 which are connected to computer 300 record parameters of interest as a function of time throughout the operation and are therefore available for post-operation critique. These parameters may be:

(1) Systolic blood pressure.
(2) Diastolic blood pressure.
(3) Pulse rate.
(4) Effective dosage of pentothal in the viscera. This is the amount assumed active in causing the reaction.
(5) The combined effective dosage of vasopressors #1 and #2. Both vasopressor #1 and #2 affect the blood pressure in the same maner; however, #1 elevates pulse rate while #2 depresses it.
(6) Blood circulation.
(7) Blood $CO_2$ level.
(8) Effective concentration of nitrous oxide in the viscera which is the amount assumed active in causing the reaction.
(9) Modified $CO_2$ level—This reflects modifications on the effectiveness of blood $CO_2$ level brought about by drugs.
(10) Effective level of oxygen in the tissue.
(11) Breathing rate—as computed by the model.
(12) Breathing amplitude—as computed by the model.
(13) Ventilation rate—The product of computed breathing rate and amplitude and a suitable constant. (This will only be ventilation rate as long as no aided ventilation is induced by the student and no lung blockages are in effect.)
(14) Anesthesia level—A composite summation of the effective dosages of all anesthesia drugs in the viscera.
(15) Effective Dosage of Succinylcholine.—The amount of the relaxant drug effective in producing the reaction.
(16) Effective Concentration of Cyclopropane in the Viscera which is the amount assumed active in causing the reaction.

The anesthesia machine 10 uses compressed air for oxygen and compressed carbon dioxide for nitrous oxide and cyclopropane. These gases are readily available, easy to handle and closely approximate the gas densities of those actually used in anesthesia. Thus, the flow meter's calibrations will not be seriously affected. Pressure should be regulated upstream of the needle valves in order that valve position will correspond with gas flow rates.

In the anesthesia machine 10 in-line orifices have been placed at each of the flow type flow meter outlets. Reading pressure differential across the orifices gives a reading proportional to flow rate.

Figure 14:
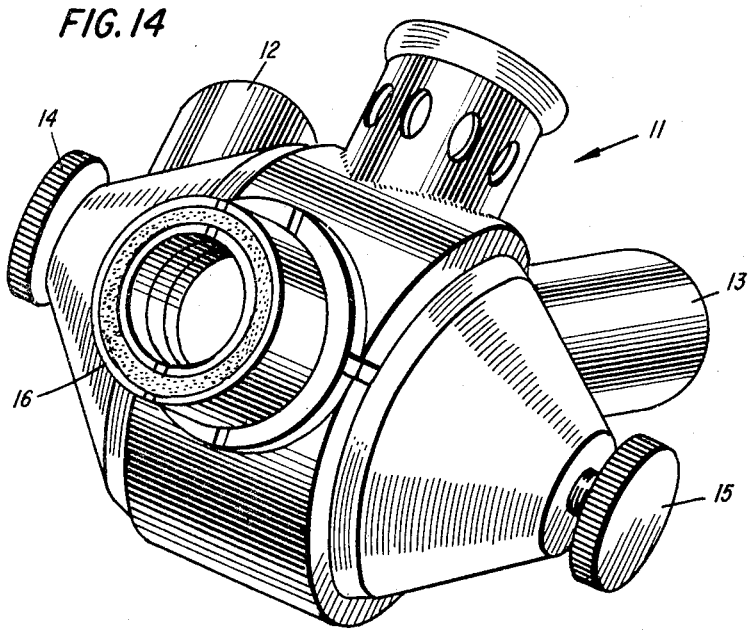
FIG. 14 illustrates a Y valve used in connection with the anesthesia machine.

A modified swivel Y valve 11 is used in the gas flow lines connected from anesthesia machine 10 to airway 137, or face mask 129 when it is used. Its position is illustrated in FIG. 1 and an enlarged detailed view of the valve 11 is shown in FIG. 14. Valve 11 has inputs 12 and 13 from anesthesia machine 10 and control knobs 14 and 15 to control flow from tubes 12 and 13 respectively to output tube 16 connected to airway 137.

Figure 15:
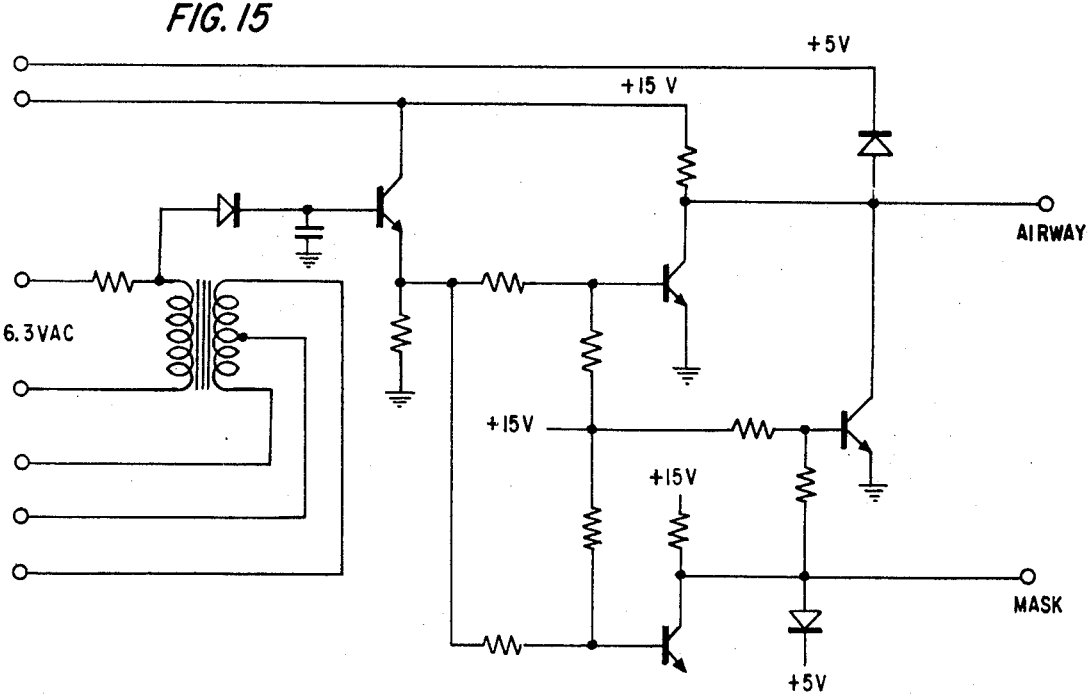
FIG. 15 is a circuit diagram of a Y valve sensor.

With an electrical circuit as shown in FIG. 15, completed through the metal airway connector 17, or a metal O ring seal on mask 129, and the portions of output tube 16 of valve 11, the computer 300 will detect the presence of either the airway 137 or mask 129. Wires are led back through the flexible rubber hoses and out through a connector to the operating table 60. From here the signal is sensed by the computer 300 and modifications to the reactions of the manikin 100 made accordingly. All excitation and signal connections to the pressure transducers and the sphygmamonometer read-out, which is placed permanently on the anesthesia machine, are through this same connector.

With the many component parts operated in combination with each other as discussed above the present invention has produced a valuable training device which can simulate the "human" reactions of a patient being administered anesthesia during surgery.

It will be obvious to those skilled in the art that various changes may be made without departing from the scope of the invention and the invention is not to be considered limited to what is shown in the drawings and described in the specification.

What is claimed is:

1. A training simulator comprising
a manikin for receiving outside stimuli,
stimuli sensing means within said manikin to produce signals in response to said outside stimuli,
computer means connected to said stimuli sensing means to receive said signals from said manikin and to produce monitoring, actuating and control signals in response to said received signals from said manikin,
reacting means within said manikin to receive said actuating and control signals and produce a reaction indicative of the outside stimuli present,
and control means connected to said computer means to receive said monitoring signals from said computer means and insert override and additional input signals into said computer means to vary selected ones of said monitoring, actuating and control signals.

2. The training simulator of claim 1, further characterized by the simulator being for anesthesiological training purposes and
said manikin attached on its back in operating position on an operating table.

3. The anesthesiological training simulator of claim 2, further characterized by
said manikin having a tongue of flexible material attached therein,
said tongue including
hinge and wire therethrough attaching means to said manikin,
and a liquid filled sac in said flexible material.

4. The anesthesiological training simulator of claim 2, further characterized by
said manikin having tubular means in its neck to simulate a trachea,
tubes branching from one end of said tubular means to simulate bronchi tubes,
said stimuli sensing means including sensing means located at a plurality of positions including positions along said tubular means and said tubes and connected at least to said computer means.

5. The anesthesiological training simulator of claim 4, further characterized by
said sensing means including magnetic sensing means for detecting an instrument having a metal portion passing through said tubular means and said tubes.

6. The anesthesiological training simulator of claim 5, further characterized by
said sensing means further including fluid filled pressure sensing means
whereby an inflatable portion on an instrument passing through said tubular means is detected.

7. The anesthesiological training simulator of claim 2, further characterized by
said stimuli sensing means including sensors in the head of said manikin including
a lip sensor means to detect pressure of a pressing on the lip of said manikin,
said sensors connected to said computer means.

8. The anesthesiological training simulator of claim 2, further characterized by said stimuli sensing means including
a bulb means for receiving fluid located in said manikin,
coil means wound around said bulb means and connected in an oscillator circuit means to determine amplitude in accordance with ferrous material passing through said coil,
tube connection to said bulb means,
a valve means connected to said tube connection,
piston means connected to said tube connection through said valve means,
and variable resistance means connected to said piston means whereby resistance is changed in accordance with movement of said piston means,
said oscillator circuit means and said variable resistance means both connected to said computer means and generating at least a portion of said signals from said manikin to said computer means.

9. The anesthesiological training simulator of claim 8, further characterized by
said valve means having a solenoid control means connected to said computer means to empty fluid from said piston means.

10. The anesthesiological training simulator of claim 2, further characterized by
said manikin having tubular means in its neck to simulate at esophagus,
a tube connected into said tubular means simulating an esophagus,
a container of fluid connected to said tube, and
pressure source means connected to said container to force the fluid through said tube.

11. The anesthesiological training simulator of claim 2, further characterized by said reacting means including
motion actuators in said manikin connected to receive said actuating signals from said computer means, and
fluid pressure means connected to said motion actuators to move said motion actuators in response to said actuating signals.

12. The anesthesiological training simulator of claim 11, further characterized by
a pair of said motion actuators simulating eye dilation each including
a reciprocating plunger means connected to said fluid pressure means,
a soft rubber-like substance tip on one end of said reciprocating plunger means,
and a transparent plastic-like curved surface in contacting relation with said soft tip against which said tip is pressed during reciprocation of said plunger means.

13. The anesthesiological training simulator of claim 2, further characterized by said reacting means including
a sound transducer located under said manikin,
a heart-sound generator connected to said transducer,
said heart-sound generator including
a fixed frequency oscillator and a function generator connected to a modulator,
a multiplier connected to said modulator,
and amplitude signal control means in said computer means connected to said multiplier.

14. The anesthesiological training simulator of claim 13, further characterized by
said heart-sound generator further including
a voltage controlled oscillator receiving a heart rate signal from said computer means,
a one-shot multivibrator connected to the output of said voltage controlled oscillator,
and a ramp generator connected to said multivibrator to shape the output of said multivibrator and with its output connected to said function generator.

15. The anesthesiological training simulator of claim 14, further characterized by
switching means to disconnect said multiplier from said speaker.

16. The anesthesiological training simulator of claim 13, further characterized by a second sound transducer located in an arm of said manikin, a signal comparison switching means connected to said second transducer, and a normal pulse generator and a spurting pulse generator connected to said comparison switching means and to said heart-sound generator.

17. The anesthesiological rtaining simulator of claim 16, further characterized by pressure transducer means connected to the arm of said manikin containing said second speaker, and variable voltage means connected to said pressure transducer means and to said computer means.

18. The anesthesiological training simulator of claim 2, further characterized by an anesthesia-type machine means to supply gases through connecting tubing to said manikin, said anesthesia-type machine means connected to said computer means.

19. The anesthesiological training simulator of claim 18, further characterized by the gases supplied by said anesthesia-type machine being compressed air and carbon dioxide whereby compressed air is used for simulating the use of oxygen and crabon dioxide simulates the use of nitrous oxide and cyclopropane because of simularity of gas densities to those gases actually used in anesthesia procedures.

References Cited

UNITED STATES PATENTS

| | | | |
|---|---|---|---|
| 3,027,655 | 4/1962 | Alderson | 35—17 |
| 3,209,469 | 10/1965 | James | 35—17 |
| 3,276,147 | 10/1966 | Padellford | 35—17 |
| 3,399,467 | 9/1968 | Ravin | 35—17 |
| 3,422,965 | 1/1969 | Lloyd | 214—1 |
| 3,451,144 | 6/1969 | Chao et al. | 35—12 X |

EUGENE R. CAPOZIO, Primary Examiner

H. S. SKOGQUIST, Assistant Examiner